June 12, 1951 D. DOHM, JR 2,556,578
CLOSURE MECHANISM FOR PRESSURE VESSELS
Filed Nov. 26, 1948 2 Sheets-Sheet 1

Daniel Dohm Jr.,
Inventor.
Haynes and Koenig
Attorneys.

June 12, 1951 — D. DOHM, JR — 2,556,578
CLOSURE MECHANISM FOR PRESSURE VESSELS
Filed Nov. 26, 1948 — 2 Sheets-Sheet 2

Daniel Dohm Jr.,
Inventor.
Haynes and Koenig,
Attorneys.

Patented June 12, 1951

2,556,578

UNITED STATES PATENT OFFICE 2,556,578

CLOSURE MECHANISM FOR PRESSURE VESSELS

Daniel Dohm, Jr., University City, Mo., assignor to Dohm & Nelke, Incorporated, St. Louis, Mo., a corporation of Missouri Application November 26, 1948, Serial No. 62,107

10 Claims. (Cl. 268—75)

This invention relates to closure mechanisms for pressure vessels, and with regard to certain more specific features, to such mechanisms for sausage stuffers and the like.

Among the several objects of the invention may be noted the provision of closure apparatus for sausage stuffers and the like, which with small manual effort permits safe and fast opening and closing of the covers of such machines; the provision of apparatus of the class described which may conveniently be employed as a conversion closure unit for existing stuffing machines; and the provision of simple apparatus of this class which may economically be made of relatively light weight and ample strength. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated:

Similar reference characters indicate corresponding parts throughout the several views of the drawings.

Figure 1:
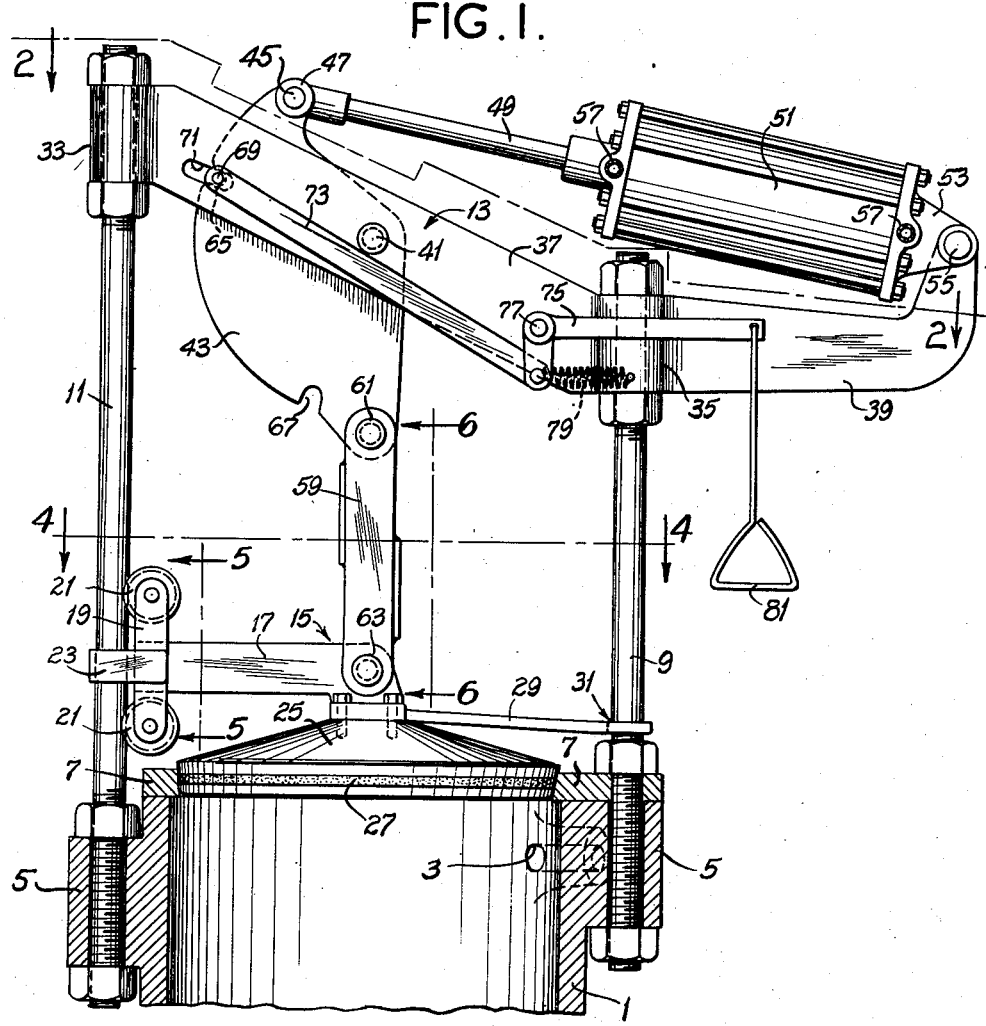
Fig. 1 is a side elevation of the parts of the invention in closed position applied to the cylinder of a sausage stuffer, the latter being partially shown in section.
Figure 5:
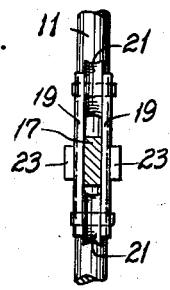
Fig. 5 is a vertical section taken on line 5—5 of Fig. 1.
Figure 2:
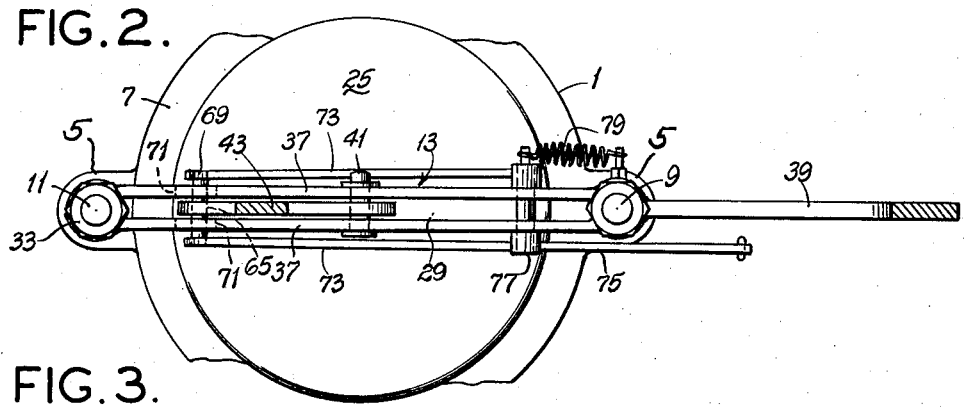
Fig. 2 is a horizontal section taken on line 2—2 of Fig. 1.

While the principles of the invention to be described may be applied to closures in general for pressure vessels, it is particularly advantageous in connection with closures for existing sausage stuffers in connection with which the following description will be made by way of example.

In general, a sausage stuffer consists of a relatively large vertical cylinder open at the top, and adapted to be closed by means of an openable, sealed lid. This cylinder contains a piston which is normally retracted to the bottom of the cylinder for permitting loading with ground meat, loading being accomplished with the lid removed from the upper end of the cylinder. Then the lid is closed and the piston forced up to place the meat under considerable pressure. This forces the ground meat through suitable openings in the upper end of the cylinder into connected extrusion nozzles. The sausage casings are applied to those nozzles for filling.

The lids are quite heavy and it has been the practice to provide a swivel post on one side of the cylinder for an arch beam pivoted to this post. The other side of the cylinder is provided with another post with which the non-pivoted end of the arch may be engaged and locked. A screw mechanism on the arch supports the lid. When the arch is locked between posts, the lid may be screwed shut. For opening, the lid is screwed open and the arch unlocked from one post and swung on the other to clear the cylinder. The disadvantage of this construction and similar ones is the danger of accident in swinging the arch open and shut; the difficulty of operating it manually in its relatively inaccessible elevated position at the upper end of the cylinder, which is tall; and the time consumed in carrying out the slow threading and unthreading operations required for closing and opening the lid.

Referring now more particularly to the drawings, there is shown at numeral 1 the upper end of a sausage stuffer cylinder having extrusion outlets, one of which is shown at 3. This cylinder is usually provided with two opposite lugs, as shown at 5, for attaching posts 9 and 11 and it usually has a safety ring 7, with a beveled seat. The safety ring inwardly overhangs the cylinder 1 to provide a limiting stop for the upward travel of the piston used in the cylinder 1. This piston is not shown in the drawing, being old per se. Bolted to the lugs 5 are posts 9 and 11 on opposite sides of the cylinder opening. Post 9 is preferably shorter than post 11. These are substantially parallel and, as will be seen, are to function as guide, tension and support members. They support an upper rigid bridge and cradle assembly 13 and guide a cover carrier or crosshead 15. Their tension functions will appear.

Referring first to the cover carrier 15, it is constituted by a lateral arm 17 welded between spaced bars 19, between the ends of which are carried rollers 21 adapted to travel on the post 11. Spaced lugs 23, welded to the sides of the plates 19, serve as sliding guides on opposite sides of the post 11. The arm 17 is bolted to the top of a cover 25, which is to be opened and closed relative to the ring 7. This cover is beveled to match the bevel of the ring 7 and includes a usual packing member 27. Welded to and extending from the arm 17 is an extension arm 29 which, as shown at 31, is forked around the post 9 for guiding purposes. From the above description of the crosshead assembly or carrier 15, it will be seen that by moving it up and down, it will be guided by the posts 9 and 11, and that by this means the cover 25 may ascend to open and descend to close on the ring 7 of the cylinder 1 (compare Figs. 3 and 1).

Referring now to the bridge assembly 13, it is constituted by bushings 33 and 35 fastened to the upper ends of the posts 11 and 9, respectively. Between the bushings 33 and 35 are welded spaced plates 37. These form a sloping beam. Welded to and extending from the bushing 35 is a cantilever beam 39. The beams form a rigid cradle for parts to be described. Midway between the posts 9 and 11, a bearing pin 41 is provided in the beam plates 37. This pivots between the plates an oscillatory operating cam or plate member 43, the latter being oscillatory between the positions shown in Figs. 1 and 3. Pivoted to the cam at 45 is the forked end 47 of a piston rod 49, the latter passing into one end of an air cylinder 51, wherein it is fastened to the usual piston employed in such a cylinder. The other end of the air cylinder, by means of a fork 53 and pin 55, is pivoted to the outer end of the cantilever beam 39. Air inlet and exhaust ports are shown at 57. By means of suitable piping and control valves (not shown), air may be admitted to one port 57 and exhausted from the other, and vice versa. When air is admitted to the right-hand port 57 (and released from the left-hand port), the plate or cam member 43 is in the anticlockwise position shown in Fig. 1. When air is admitted to the left-hand port 57 and released from the right-hand port, the piston rod 49 is retracted and the plate or cam member 43 placed in the clockwise position shown in Fig. 3.

Figure 3:
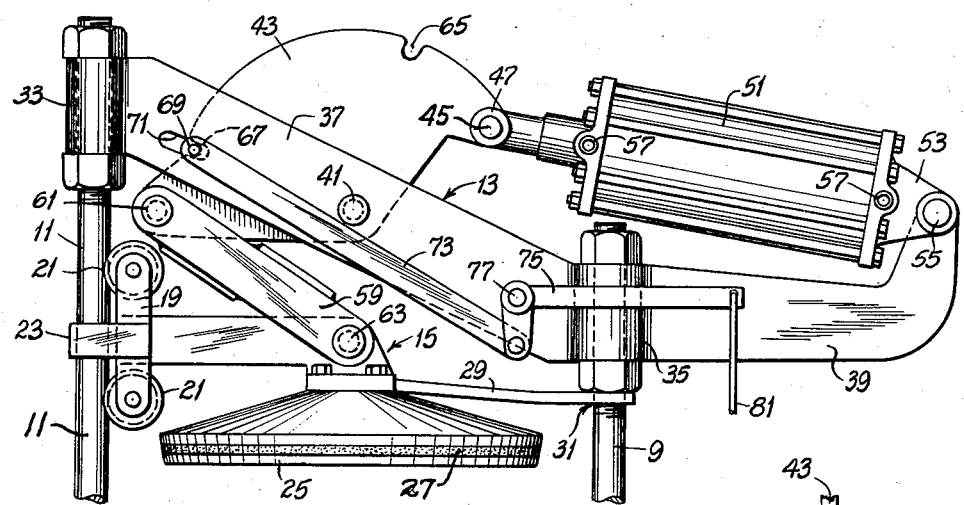
Fig. 3 is a partial view similar to Fig. 1, showing parts in an open position.
Figure 4:
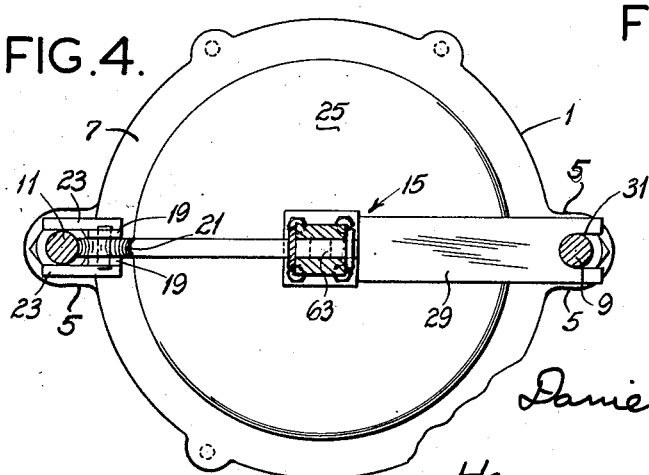
Fig. 4 is a vertical section taken on line 4—4 of Fig. 1.
Figure 6:
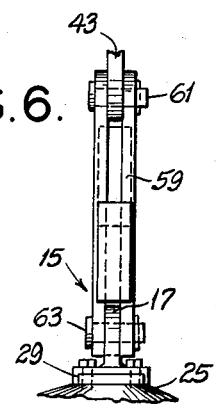
Fig. 6 is a horizontal section taken on line 6—6 of Fig. 1.

The plate or cam member 43 is connected to the cover carrier 15 by means of a connecting link 59, pivoted to the cam at 61 and to the assembly at 63. The cam or plate member is provided with two radial notches 65 and 67, engageable by a lock pin 69 which passes through slots 71 in the bars 37. The position of the pin in the slots 71 is controlled by links 73, which extend to bell cranks 75 carried on a common pin 77 passing through the plates 37. The bell cranks are relatively rigid, since they are fastened to the pin 77, the latter rotating in openings in the plates 37. A spring 79 biases the bell cranks anticlockwise. The bell cranks may be rotated clockwise by a manual control handle 81, which is in a convenient position for operation. When the handle 81 is pulled, the lock pin 69 is pushed out along slots 71 clear of either notch 65 or 67. When the handle 81 is released, the spring 79 in effect biases the pin 69 to drop into whichever notch 65 or 67 comes into registry with the slots 71. Between notches the pin 53 rides the edge of the plate 43. Notch 65 comes into registry when the plate 43 is in its anticlockwise position shown in Fig. 1. At this time the cover 25 is closed. At this time the centers of pins 41, 61 and 63 are in approximate alignment and the cover has been squeezed shut to effect a seal between the packing 27 and the ring 7. Any pressure (which is substantial) upon the cover due to the pressure on the contents in cylinder 1, exerts little, if any, rotary movement upon the plate or cam member 43. Hence the pneumatic operating parts 49 and 51 for controlling the cam are not called upon to resist the pressure load on the cover. This is taken up by the pin joints at 41, 61 and 63. Nor is there any consequential shearing action applied to the pin 69. Thus the pin 69 exerts a positive locking action without being called upon to resist any substantial force. The reason for the stated functions is that the oscillatory cam plate 43 and the link 59 function as a toggle mechanism which in the parlance used in connection with such mechanism is straightened when the cover is closed as shown in Fig. 1, and is angled or broken when the cover is opened, such as shown in Fig. 3.

When it is desired to lift the cover 25, the control handle 81 is pulled which releases the plate or cam member 43 for clockwise rotation and air is admitted into the left-hand air port 57 while it is automatically released from the right-hand port 57. The fact that the control handle 81 needs first to be operated in order to release the latching action of pin 69 in slot 65, is a safety feature preventing cam 43 from rotating if air be inadvertently applied to the cylinder 51. After rotation has started, the handle 81 is released, whereupon the locking pin 69 is automatically biased into the notch 67 when it reaches registry with the slots 71. Thus the cover 25 is latched in its elevated, open position shown in Fig. 3. Since the cover is in effect locked open, there is no chance by mere inadvertence in controlling the air to cylinder 51, or failure of air, that the open cover will fall and injure anyone performing filling operations in connection with the cylinder 1.

No lateral swinging operations are required of the beam parts 37 and cover 25. Hence the danger of striking an adjacent workman or mangling a hand in coupling beam parts to the posts 9 or 11, is obviated. Moreover, slow-operating threads are not required for attaining a tight closing pressure on the cover 25, since this is obtained by the resulting toggle action effected between the plate or cam member 43 and the link 59 as the latter comes into vertical position upon closing. It is to be noted in this connection that when the cover is up (Fig. 3) link 59 is compactly nested under the sloping beam parts 37. Also, the angled rigid beam parts 37 and 39 form a nesting cradle for the pneumatic power parts 49 and 51. It is also to be observed that the air-operating cylinder 51 may be relatively small, since it is not required to provide reactive force against the pressure on the cover 25. The operations required for manipulation may be quickly accomplished, unlike the slow operations required for manipulating a screw.

A safety feature to be noted is in respect to the locking detention effect between the pin 69 and notches 65 and 67. These automatically position and lock the mechanism for open and shut positions without requiring close control of the air flowing to and from cylinder 51.

It will be noted that wear on the gasket 27 may be taken up by loosening the nuts which hold the posts 9 and 11, adjusting the posts downward, and then retightening the nuts.

In view of the above, it will be seen that the several objects of the invention are achieved and other advantageous results attained.

As many changes could be made in the above constructions without departing from the scope of the invention, it is intended that all matter

I claim:

1. A cover closure mechanism for a cover for a pressure vessel opening, comprising extensions from opposite sides of the opening, a member guided by said extensions and movable to and from the opening and carrying said cover, a beam spanning said extensions, an oscillatory member pivoted to the beam, a link connecting said oscillatory member to the guided member to form a toggle mechanism extending between the beam and the guided member, power mechanism for the oscillatory member, said oscillatory member being movable from a position in which the toggle mechanism is angled and the cover is moved toward the beam for opening, to a position in which the toggle mechanism is straightened and the cover is moved away from the beam to shut, the toggle mechanism formed by the oscillatory member and said link with the guide member being arranged to direct substantially all of the force on the cover when closed to the beam and substantially none of said force to rotation of the oscillatory member, and releasable interlock means between the oscillatory member and the beam adapted to lock the oscillatory member in either of two positions respectively corresponding to said cover being substantially open or shut.

2. A cover closure mechanism for a cover for a pressure vessel opening, comprising posts extending outward from opposite sides of the opening, a member guided by said posts and movable to and from the opening and carrying said cover, an angled beam spanning said posts and having an extension to form a cradle, an oscillatory member pivoted to the beam, a link connecting said oscillatory member to the guided member to form a toggle mechanism extending between said beam and the guided member, pneumatic power mechanism for oscillating the oscillatory member and carried by the cradle, said oscillatory member being movable from a position in which the cover is moved toward the beam for opening to a position in which the cover member is moved away from the beam to shut, the toggle mechanism formed by the oscillatory member and said link with the guide member being arranged to direct to the beam substantially all of the force on the cover when closed and substantially none of said force to the power mechanism, said beam being angled relative to the posts to afford a nesting position for said link when the cover is open.

3. A closure mechanism for a cover for an opening of a pressure vessel, comprising substantially parallel guide and tension posts, one of which is longer than the other both extending outward from opposite sides of the opening, a crosshead member movable to and from the opening and guided by said posts and carrying said cover, a beam spanning the outer ends of said posts and an arm extending from one of them to form a cradle, an oscillatory member pivoted to the beam and linked to the crosshead member, power mechanism for oscillating the oscillatory member, comprising an air cylinder pivoted to one end of the cradle and a piston rod extending from said cylinder and pivoted to the oscillatory member, said oscillatory member being movable from a position in which the cover is lifted open to a position in which the cover is depressed shut, the oscillatory member and its link with the crosshead member being arranged to direct substantially all of the force on the cover when closed to the beam and substantially none of said force to the power mechanism.

4. A closure mechanism for a cover for an opening of a pressure vessel, comprising substantially parallel guide and tension posts, one of which is longer than the other, both extending outward from opposite sides of the opening, a crosshead member movable to and from the opening and guided by said posts and carrying said cover, a beam spanning the outer ends of said posts and an arm extending from one of them to form a cradle, an oscillatory member pivoted to the beam and linked to the crosshead member, power mechanism for oscillating the oscillatory member, comprising an air cylinder pivoted to one end of the cradle and a piston rod extending from said cylinder and pivoted to the oscillatory member, said oscillatory member being movable from a position in which the cover is lifted open to a position in which the cover is depressed shut, the oscillatory member and its link with the crosshead member being arranged to direct substantially all of the force on the cover when closed to the beam and substantially none of said force to the power mechanism, said beam being angled relative to the extensions to afford a nesting position for said link when the cover is open.

5. A closure mechanism for a cover for an opening of a pressure vessel, comprising posts extending outward from opposite sides of the opening, a member guided by said posts and movable to and from the opening and carrying said cover, a beam spanning said posts, an oscillatory member pivoted to the beam and linked to the guided member, said oscillatory member having two detent openings, power mechanism for oscillating the oscillatory member, said oscillatory member being movable from a position in which the cover is lifted open to a position in which the cover is depressed shut, and manually releasable detent means cooperative with said openings for releasably detaining the oscillatory member either in its position to hold the cover open or in its position to hold the cover closed.

6. A closure mechanism for a cover for an opening of a pressure vessel, comprising substantially parallel guide and tension posts, one of which is longer than the other, both extending outward from opposite sides of the opening, a crosshead member movable to and from the opening and guided by said posts and carrying said cover, a beam spanning the outer ends of said posts and an arm extending from one of them, an oscillatory plate pivoted to the beam and linked to the crosshead member, said plate including two notches, power mechanism for oscillating the plate, comprising an air cylinder pivoted to said arm and a piston rod from said cylinder pivoted to said plate, said oscillatory member being movable from a position in which the cover is lifted open to a position in which the cover is depressed shut, the oscillatory member and its link with the crosshead member being arranged to direct substantially all of the force on the cover when closed to the beam and substantially none of said force to the power mechanism, and a manually releasable automatic detent device cooperative with said notches for releasably locking the oscillatory member in either of its two positions to hold the cover open or in its position to hold the cover closed.

7. A closure mechanism for a cover for an opening of a pressure vessel, comprising substantially parallel guide and tension posts, one of which is longer than the other, both extending outward from opposite sides of the opening, a crosshead member movable to and from the opening and guided by said posts and carrying said cover, a sloping beam comprising spaced plates straddling the outer ends of said posts, an arm extending from said beam and forming therewith a cradle, an oscillatory plate pivoted between the plates of said beam and linked to the crosshead member, power mechanism for oscillating the oscillatory plate comprising an air cylinder pivoted to said arm and a cooperating piston rod pivoted to said plate, said power mechanism being cradled above the beam and arm, said oscillatory plate being movable from a position in which the cover is lifted open to a position in which the cover is depressed shut, the oscillatory plate and its link with the crosshead member forming a toggle arrangement, a slidable pin straddling slots in said beam plates, said oscillatory plate being notched at intervals such that when the notches register with said slots the pin is movable into the respective notch to detain the plate in a position to hold the cover open or closed respectively, and a mechanism biasing said pin for detention of the plate, said last-named mechanism being manually openable against its bias to move the pin from either notch.

8. A cover closure mechanism for sausage stuffers and the like comprising a cover carrier, a guide for the carrier constraining its movement and that of the cover in a substantially straight line, a fluid operator, a linkage connecting said fluid operator and the carrier, said linkage including a two-link toggle mechanism, one link having notches, and a detent mechanism engageable with said notches to hold the link either in an open or closed position of the cover.

9. A cover closure mechanism for sausage stuffers and the like comprising a cover carrier, a guide for the carrier constraining its movement and that of the cover in a substantially straight line, a fluid operator, a linkage connecting said fluid operator and the carrier, said linkage comprising a two-link toggle mechanism, one of the links being in the form of a double-notched plate, a detent mechanism cooperating with the plate and biased toward the notches when registered therewith automatically to detain the linkage in either of two positions in which the cover is either open or closed, and manual means for releasing said detent mechanism.

10. A closure mechanism for a cover for an opening of a pressure vessel, comprising guides extending from the opposite sides of the opening, a carrier member guided thereby and movable to and from the opening and carrying said cover, a cross member extending from said guides, a toggle mechanism between the cross member and the carrier comprising a cam plate pivoted to the cross member and a connecting link pivoted to the plate and to said carrier, a power mechanism for oscillating said plate, said toggle mechanism being adapted to be straightened when the plate is moved to a position wherein the cover is closed and to be angled when the plate is moved to a position wherein the cover is opened, notches in the edge of said plate, a mechanism having a detent part biased toward the edge of said plate automatically to engage the respective notches when the cover is respectively opened or closed, and manually operable means for overcoming said bias to move said detent part from either notch.

DANIEL DOHM, Jr.

REFERENCES CITED

The following references are of record in the file of this patent:

UNITED STATES PATENTS

| Number | Name | Date |
| --- | --- | --- |
| 1,783,687 | Wood et al. | Dec. 2, 1930 |
| 1,813,601 | Bacheldor | July 7, 1931 |
| 1,825,129 | Rowntree | Sept. 29, 1931 |
| 1,995,779 | Penconic | Mar. 26, 1935 |